USO11341193B2

(12) United States Patent
Holt

(10) Patent No.: US 11,341,193 B2
(45) Date of Patent: May 24, 2022

(54) METHODS AND SYSTEMS FOR TEMPLATE GENERATION

(71) Applicant: Capital One Services, LLC, McLean, VA (US)

(72) Inventor: Curtis Holt, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 173 days.

(21) Appl. No.: 16/915,200

(22) Filed: Jun. 29, 2020

(65) Prior Publication Data
US 2021/0406319 A1 Dec. 30, 2021

(51) Int. Cl.
G06F 16/93 (2019.01)
G06N 20/00 (2019.01)

(52) U.S. Cl.
CPC ............ *G06F 16/93* (2019.01); *G06N 20/00* (2019.01)

(58) Field of Classification Search
CPC .......... G06F 16/93; G06F 40/10; G06N 20/00
See application file for complete search history.

(56) References Cited

U.S. PATENT DOCUMENTS

| 7,107,525 | B2 | 9/2006 | Purvis |
| 7,764,830 | B1 | 7/2010 | Wnek |
| 9,208,450 | B1 | 12/2015 | Nanda et al. |
| 9,223,773 | B2 | 12/2015 | Isaacson |
| 11,227,095 | B2 * | 1/2022 | Cotran ................. G06Q 10/101 |
| 2017/0220545 | A1 * | 8/2017 | Gururajan ............. G06F 40/106 |
| 2020/0285695 | A1 * | 9/2020 | Suzuki .................. G06F 40/131 |

* cited by examiner

Primary Examiner — Hau H Hoang
(74) Attorney, Agent, or Firm — Bookoff McAndrews, PLLC

(57) ABSTRACT

A computer-implemented method for template generation may include: receiving a first plurality of variables, each of the first plurality of variables specifying a feature to be implemented in a new template for document generation; for each of a plurality of existing templates for document generation, determining a degree of similarity between the first plurality of variables and a plurality of variables included in the respective existing template; upon determining that none of the degrees of similarity respectively determined for the plurality of existing templates satisfies a similarity threshold, determining that a combination of variables from two or more of the plurality of existing templates has a degree of similarity with the first plurality of variables satisfying the similarity threshold; and generating the new template based on the two or more of the plurality of existing templates.

20 Claims, 10 Drawing Sheets

VARIABLES LIST TEMPLATES (TEMPLATE 1) — 306

| VARIABLE | USED IN COMMUNICATION? |
|---|---|
| <F1> | YES |
| <F2> | YES |
| <F3> | YES |
| <F4> | YES |
| ... | ... |
| <F22> | NO |
| <F23> | NO |
| ... | ... |

208

FIELD CORRESPONDENCE TEMPLATE (TEMPLATE 2) — 308

| FIELD IN COMMUNICATION DATA | FIELD IN TEMPLATE LAYOUT |
|---|---|
| FULL_NM | F1 |
| ADR_LINE_1_TXT | F5 |
| ADR_LINE_2_TXT | F6 |
| CITY_NM | F9 |
| GEO_ST_CD | F10 |
| ... | ... |

NULL VALUES TEMPLATE (TEMPLATE 3) — 310

| FIELD | RECORD NUMBER |
|---|---|
| ADDRESS | 6 |
| NAME | 6 |
| ADDRESS | 9 |
| NAME | 9 |
| ... | ... |

*FIG. 5*

METHODS AND SYSTEMS FOR TEMPLATE GENERATION

TECHNICAL FIELD

Various embodiments of the present disclosure relate generally to generating templates for producing communication documents, and, more particularly, to automated template generation.

BACKGROUND

Communication channels, such as Keep Me Informed ("KMI"), can be an essential component or process for many business providers to communicate with their customers. KMI can send communication documents to customers via direct mail or electronic communications (e-mail). The KMI process may be labor intensive as many communication requestors (e.g., individuals requesting communication documents to be generated) and data analysts may be involved. The KMI process may also face many issues. For example, information to be communicated may include incorrect or incomplete information due miscommunication between the communication requestors and data analysts, or information may be sent to incorrect addresses. As such, many intended recipients of such information (e.g., customers) may not receive (or may not timely receive) appropriate information which may negatively impact a customer's experience. Additionally, if the information is required (e.g., legally required, required to satisfy a policy, etc.) to be disseminated, failure to do so may result in violating such requirements.

The present disclosure is directed to overcoming the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for template generation and communication documents production. The methods and systems may provide an automated mechanism that boosts the efficiency and minimizes the errors in the communication documents or a process of communication.

In an aspect, a computer-implemented method for template generation may include: receiving a first plurality of variables, each of the first plurality of variables specifying a feature to be implemented in a new template for document generation; for each of a plurality of existing templates for document generation, determining a degree of similarity between the first plurality of variables and a plurality of variables included in the respective existing template; upon determining that none of the degrees of similarity respectively determined for the plurality of existing templates satisfies a similarity threshold, determining that a combination of variables from two or more of the plurality of existing templates has a degree of similarity with the first plurality of variables satisfying the similarity threshold; and generating the new template based on the two or more of the plurality of existing templates.

In another aspect, a computer system for template generation may include a memory storing instructions; and one or more processors configured to execute the instructions to perform operations. The operations may include: recording a first template for document generation; including the first template in a plurality of existing templates for document generation, the plurality of existing templates being a set of templates stored in the memory; receiving a first plurality of variables, each of the first plurality of variables specifying a feature to be implemented in a new template for document generation; for each of the plurality of existing templates for document generation, determining a degree of similarity between the first plurality of variables and a plurality of variables included in the respective existing template of the plurality of existing templates; upon determining that none of the degrees of similarity respectively determined for the plurality of existing templates satisfies a similarity threshold, determining that a combination of variables from two or more of the plurality of existing templates has a degree of similarity with the first plurality of variables satisfying the similarity threshold; and generating the new template based on the two or more of the plurality of existing templates.

In yet another aspect, a computer-implemented method for generation of documents may include: generating a plurality of templates, each of the plurality of templates including a plurality of variables each specifying a feature for document generation; receiving a set of variables, each variable in the set of variables specifying a feature to be implemented in a new template for document generation; for each of a plurality of templates, determine a degree of similarity between the set of variables and a plurality of variables included in the respective template; upon determining that none of the degrees of similarity respectively determined for the plurality of templates satisfies a similarity threshold, determining that a combination of variables from two or more of the plurality of templates has a degree of similarity with the plurality of variables satisfying the similarity threshold; generating the new template based on the two or more of the plurality of templates; and using the new template to produce a document.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 depicts an exemplary variables list template, an exemplary field name conversion template, and an exemplary null values template, according to one or more embodiments.

DETAILED DESCRIPTION OF EMBODIMENTS

Figure 1:
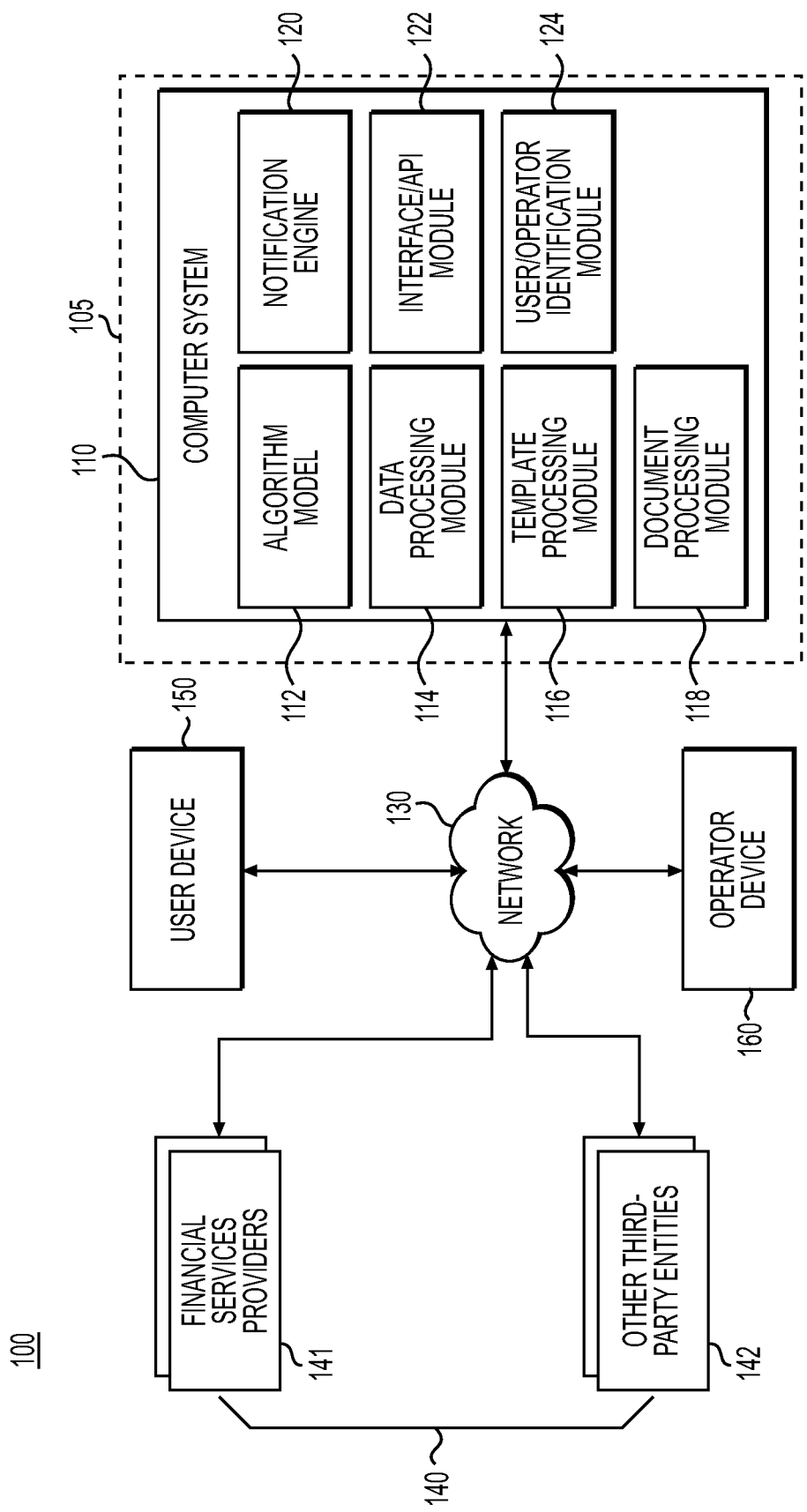
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data, such as a plurality of variables, may be used to generate a new template.

The methods disclosed herein may provide an automated keep me informed ("KMI") communication generator that may review raw data associated with generating communication documents (e.g., a direct mail or e-mail sent to customers of a business provider, such as a financial services provider) for a communication (e.g., a process of generating and sending communication documents), analyze key components associated with the communication for accuracy, correct errors in communication documents, and/or use a plurality of templates to process and determine the best means to complete a communication. The communication may be initiated by one or more resources 140, computer system 110, or entity 105 to provide information (e.g., an advertisement or promotion, policy change notice, updated terms of an agreement, and/or new products or services available) to recipients, subscribers, or customers, for example, customers of the one or more resources 140, computer system 110, or entity 105. A communication may be an operation or process of communicating information to recipients. Examples of recipients may include customers or potential customers, holders of an interest, and/or parties to an agreement, policy, contract, or the like. The information may be communicated in the form of communication documents. The content of the information communicated in a communication may depend on the type of organization that is engaged in the communication. For example, a financial services provider, such as a bank, may wish to communicate information to its customers regarding matters such as risk events, annual privacy notices (APNs), tax notifications, escheatment, and services offered by the financial services provider. If the financial services provider is offering a new service, such as a new credit card, it may conduct a communication to disseminate information regarding the new service in order to market the new service to existing and prospective customers. Such information may be communicated in the form of communication documents.

A communication may communicate or disseminate communication documents using any suitable manner of communication, such as direct mail and e-mail. Additional examples of manners of communication may include direct mail with a check, statement inserts (SI), and/or interstitials, which are utilized in the financial services industry. An e-mail may be an event-based message (EBM), which may include a reusable e-mail setup used to send e-mails quickly. A statement insert may be a buck slip with the information that may be included with mailed statements to the customers. An interstitial may be a message that is displayed to a user in a user application, such as a web browser or mobile application for banking.

The methods disclosed herein may utilize a trained machine learning algorithm (e.g., a neural network) that is generated via training phases using a Visual Basic for Applications ("VBA") interface with a locally connected database to record data, decisions and parameters for a series of variables associated with the communication. Once a certain number of templates has been created, machine learning algorithms may be used to determine an efficient way to complete a communication. Such a method may reduce the time to complete a process of generating communication documents from hours to 30 minutes or less.

FIG. 1 is a diagram depicting an example of a system environment 100 according to one or more embodiments of the present disclosure. The system environment 100 may include a computer system 110, a network 130, one or more resources for collecting data 140, a user device (or a device associated with a user) 150, and an operator device 160. The one or more resources for collecting data 140 may include financial services providers 141, or other third-party entities 142. These components may be connected and/or in communication with one another via network 130.

The computer system 110 may have one or more processors configured to perform methods described in this disclosure. The computer system 110 may include one or more modules, models, or engines. The one or more modules, models, or engines may include an algorithm model 112, a data processing module 114, a template processing module 116, a document processing module 118, a notification engine 120, an interface/API module 122, and/or a user/operator identification module 124, which may each be software components stored in/by the computer system 110. The computer system 110 may be configured to utilize one or more modules, models, or engines when performing various methods described in this disclosure. In some examples, the computer system 110 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others may be added.

The algorithm model 112 may be a plurality of algorithm models. The algorithm model 112 may include a trained machine learning model. Details of algorithm model 112 are described elsewhere herein. The data processing module 114 may be configured to monitor, track, clean, process, or standardize data (e.g., a first plurality of variables, an existing template) received by the computer system 110. One or more algorithms may be used to clean, process, or standardize the data. The template processing module 116 may be configured to generate and/or store new templates or manage (e.g., classify, update, categorize) existing templates. The template processing module 116 may further include a template generation module 204 (e.g., generating a new template via one or more algorithms) and/or a template inventory 206 (e.g., databases to store new templates or existing templates), as described in connection with FIG. 2. The document processing module 118 may be configured to generate and/or store communication documents or manage (e.g., classify, update, categorize) previous communication documents. The document processing module 118 may further include a document generation module 210 (e.g., which may generate a communication document based on a template), as described in connection with FIG. 2. The notification engine 120 may be configured to generate and communicate (e.g., transmit) one or more notifications (e.g., the communication document) to a user device 150, an operator device 160, or one or more resources 140 via network 130. The interface/API module 122 may allow the user or the operator to interact with one or more modules, models, or engines of the computer system 110. The user/operator identification module 124 may manage identification data for each user or operator accessing the computer system 110. In one implementation, the identification data associated with each user or operator may be stored to, and retrieved from, one or more components of the data storage associated with the entity 105, computer system 110, or one or more resources 140.

Computer system 110 may be configured to receive data from other components (e.g., one or more resources 140, user device 150, and/or operator device 160) of the system environment 100 via network 130. Computer system 110 may further be configured to utilize the received data by inputting the received data into the algorithm model 112 to produce a result (e.g., a new template). Information indicating the result may be transmitted to a user device 150, an operator device 160, or one or more resources 140 over network 130 via notification engine 120. In some examples, the computer system 110 may be referred to as a server system that provides a service including providing the information indicating the received data and/or the result to one or more resources 140, user device 150, or operator device 160.

Network 130 may be any suitable network or combination of networks and may support any appropriate protocol suitable for communication of data to and from the computer system 110 and between various other components in the system environment 100. Network 130 may include a public network (e.g., the Internet), a private network (e.g., a network within an organization), or a combination of public and/or private networks. Network 130 may be configured to provide communication between various components depicted in FIG. 1. Network 130 may comprise one or more networks that connect devices and/or components of environment 100 to allow communication between the devices and/or components. For example, the network 130 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of environment 100. In some embodiments, network 130 may be implemented using cell and/or pager networks, satellite, licensed radio, or a combination of licensed and unlicensed radio. Network 130 may be associated with a cloud platform that stores data and information related to methods disclosed herein.

Financial services providers 141 may be an entity such as a bank, credit card issuer, merchant services providers, or other type of financial service entity. In some examples, financial services providers 141 may include one or more merchant services providers that provide merchants with the ability to accept electronic payments, such as payments using credit cards and debit cards. Therefore, financial services providers 141 may collect and store data pertaining to transactions occurring at the merchants. The financial services providers 141 may include one or more databases to store any information related to the transaction or the user. In some embodiments, financial services providers 141 may provide a platform (e.g., an app on a user device) with which a user or an operator can interact. Such interactions may provide data (e.g., a plurality of variables) that may be analyzed or used in the methods disclosed herein.

Other third-party entities 142 may be any entity that is not a financial services provider 141. In some embodiments, other third-party entities may include on-line resources including webpage, e-mail, apps, or social network sites. On-line resources may be provided by manufacturers, retailers, consumer promotion agencies, and other entities. In some embodiments, other third-party entities 142 may include a merchant. Other third-party entities 142 may include merchants that may each be an entity that provides products. The term "product," in the context of products offered by a merchant, encompasses both goods and services, as well as products that are a combination of goods and services. A merchant may be, for example, a retailer, a vehicle dealer, a grocery store, an entertainment venue, a service provider, a restaurant, a bar, a non-profit organization, or other type of entity that provides products that a consumer may consume. A merchant may have one or more venues that a consumer may physically visit in order to obtain the products (goods or services) offered by the merchant. The other third-party entities 142 may include one or more databases to store any information related to the user. In some embodiments, other third-party entities 142 may provide a platform (e.g., an app on a user device) with which a user or an operator can interact. Such interactions may provide data (e.g., a plurality of variables) that may be analyzed or used in the methods disclosed herein.

The financial services providers 141 or any other type of third-party entities 142 may each include one or more computer systems configured to gather, process, transmit, and/or receive data. In general, whenever any of financial services providers 141 or other third-party entities 142 is described as performing an operation of gathering, processing, transmitting, or receiving data, it is understood that such operation may be performed by a computer system thereof. In general, a computer system may include one or more computing devices, as described in connection with FIG. 9, below.

User device 150 and/or operator device 160 may operate a client program, also referred to as a user application or operator application, used to communicate with the computer system 110. The user device 150 may be used by a user who will receive the communication document. The operator device 160 may be used by an individual (e.g., a communication requestor, a manager, a data analyst, or a copywriter) employed by, or otherwise associated with, one or more resources 140, computer system 110, or entity 105. Such an individual may participate and perform one or more activities in the process of generating a communication document via the operator device 160. The one or more activities may include reviewing a communication request provided by a communication requestor, assigning data analysts and copywriters to a process of generating a communication document, or acquiring approval from compliance. The user application or operator application may be used to provide information (e.g., information associated with a communication) to the computer system 110 and to receive information from the computer system 110. In some examples, the user application or operator application may be a mobile application that is run on user device 150 and/or operator device 160. User device 150 and/or operator device 160 may be a mobile device (e.g., smartphone, tablet, pager, personal digital assistant (PDA)), a computer (e.g., laptop computer, desktop computer, server), or a wearable device (e.g., smart watch). User device 150 and/or operator device 160 can also include any other media content player, for example, a set-top box, a television set, a video game system, or any electronic device capable of providing or rendering data. User device 150 and/or operator device 160 may optionally be portable. User device 150 and/or operator device 160 may be handheld. User device 150 and/or operator device 160 may be a network device capable of connecting to a network, such as network 130, or other networks such as a local area network (LAN), wide area network (WAN) such as the Internet, a telecommunications network, a data network, or any other type of network.

Computer system 110 and/or operator device 160 may be part of an entity 105, which may be any type of company, organization, or institution. In some examples, entity 105 may be a financial services provider. In such examples, the computer system 110 and/or operator device 160 may have access to data pertaining to a communication through a private network within the entity 105. In some cases, the computer system 110 may have access to data collected by operator device 160. In some embodiments, computer system 110 may be associated with the user device 150 and/or operator device 160.

Figure 2:
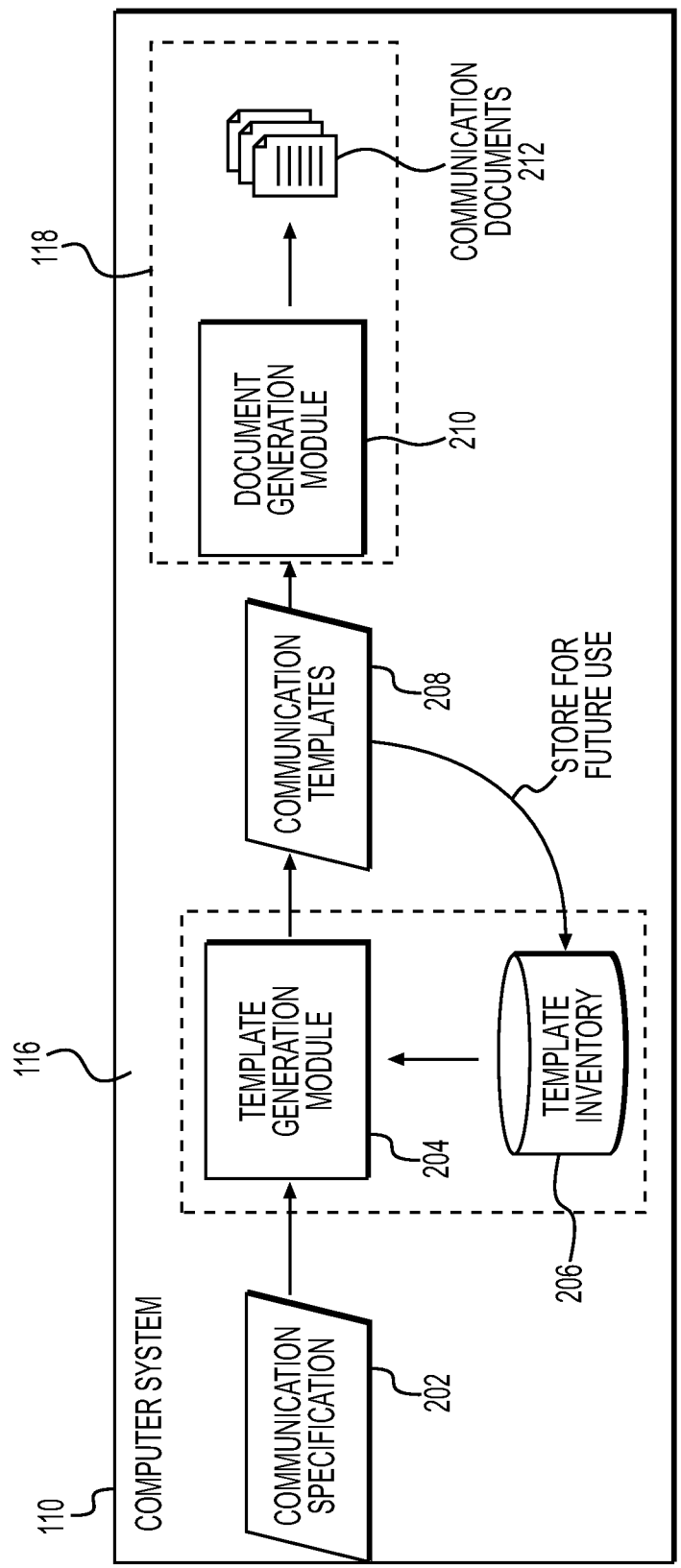
FIG. 2 depicts an exemplary block diagram depicting a process for generating a template and producing a communication document, according to one or more embodiments.

FIG. 2 illustrates an exemplary block diagram depicting a process for generating communication documents via computer system 110, according to one or more embodiments. As shown in FIG. 2, for a given communication specification 202 (e.g., an offer sheet) describing various parameters of a communication, a template generation process may be performed by a template generation module 204 of template processing module 116 of FIG. 1. The communication specification 202 may be a document (e.g., an offer sheet) provided by a communication requestor. The communication specification 202 may include any raw data or information associated with a communication, including, information of a content of the communication, or a description of a time, a communication requestor, or an intended receiver associated with the communication. The template generation process may be performed to generate communication templates 208 for the communication. The communication templates 208 may be templates used to generate the communication document. The communication templates 208 may be generated by an automatic procedure based on a plurality of variables indicated in communication specification 202 and existing templates stored in a template inventory 206 of the template processing module 116 of FIG. 1. Alternatively, communication templates 208 may be manually defined by a user via a user device 150 or by an operator via an operator device 160 of computer system 110. The communication may include any information (e.g., an advertisement, a newsletter, or notification, etc.) that one or more resources 140, entity 105, or any other entity associated with computer system 110 desires to communicate with recipients, subscribers, and/or customers. Details of the communication are described elsewhere herein.

Once communication templates 208 have been generated, computer system 110 may, via a document generation module 210 of the document processing module 118 of FIG. 1, execute a document generation process resulting in the generation of communication documents 212 for the communication. To generate the communication documents 212, one or more document layouts may be generated. Such one or more document layouts may be generated based on the communication templates 208. Details of document layouts are described elsewhere herein. Communication documents 212 may be generated based on the document layouts and/or the communication templates 208. Communication templates 208 may be stored in template inventory 206 for future use in generating future communication templates for future communications.

Figure 3:
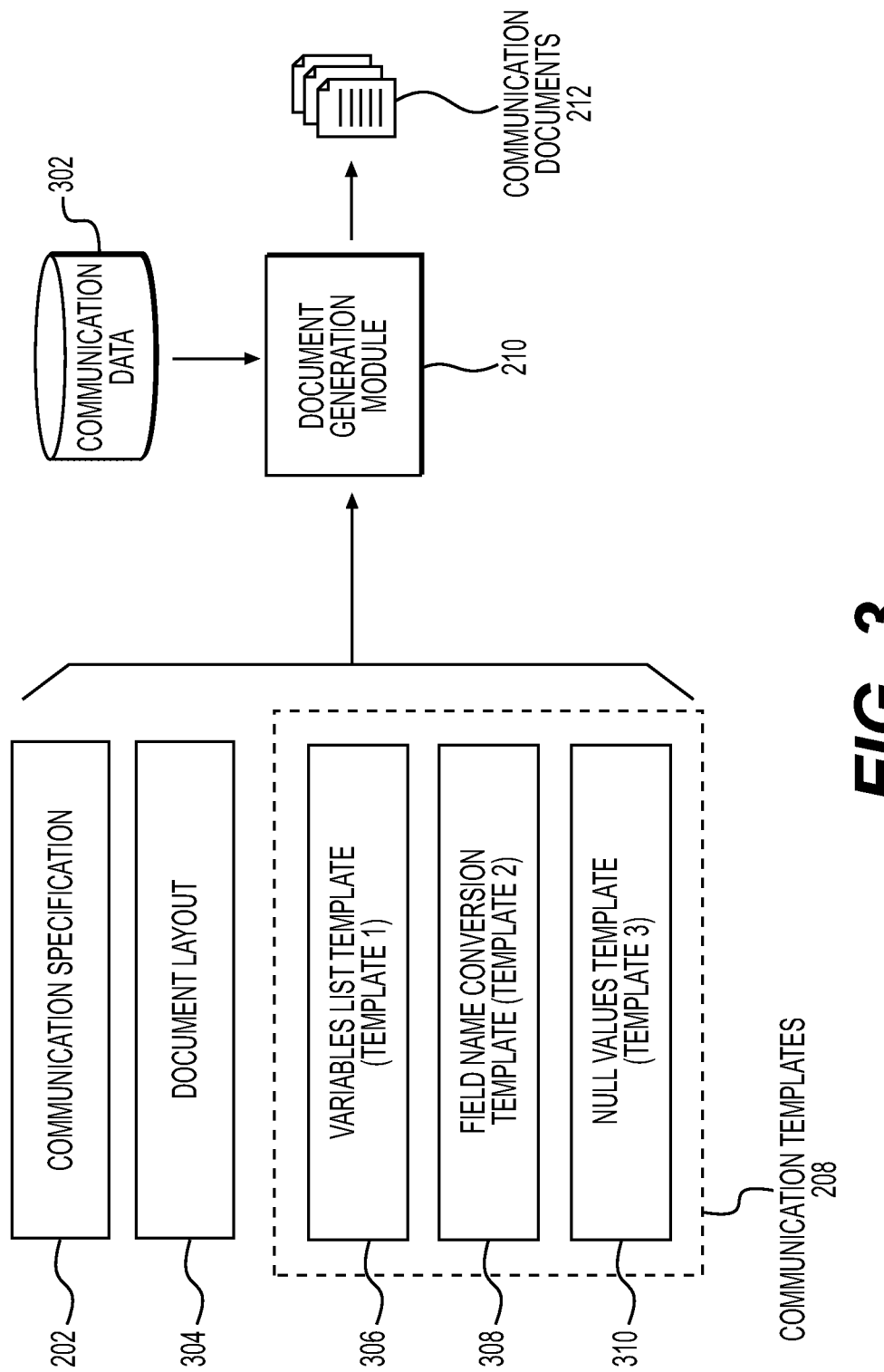
FIG. 3 depicts another exemplary block diagram depicting a process for generating a template and producing a communication document, according to one or more embodiments.

FIG. 3 illustrates an another exemplary block diagram depicting a process for generating communication documents, according to one or more embodiments. As shown in FIG. 3, communication documents 212 may be based on communication specification 202, a document layout 304, communication templates 208, and communication data 302. Communication templates 208 may include a plurality of templates, such as a variables list template 306, a field name conversion template 308, and a null values templates 310. Details of communication data are described elsewhere herein. Communication specification 202, document layout 304, communication templates 208, and communication data 302 may all be stored in computer system 110 in the form of a file or other computer-readable information.

In order to produce a communication, communication specification 202 and document layout 304 may be provided or specified via a user or an operator, and communication specification 202 and document layout 304 may be user-defined or operator-defined communication elements. The user or the operator may refer to any person that originates a communication. For example, the user or operator may be an employee of an organization (e.g., associated with computer system 110, entity 105, or one or more resources 140), such as a data analyst or execution process manager. Communication specification 202 may specify various variables of the communication. Such variables may include, for example, a list of variables that will be used in the communication. As will be described in more detail below, a variable may be a certain type of information, such as a name or address, that is to be presented on communication documents 212 generated from document layout 304. Communication specification 202 may be in the form of, for example, a document such as an offer sheet. The communication specification 202 may include any information associated with an initial request sent by a communication requestor. Such initial request may be in any format, such as a form or an excel sheet. The document layout 304 may be generated based on one or more existing templates stored with one or more resources 140, computer system 110, or entity 105. The variables of a communication may also include administrative information that is used within the organization. Communication specification 202, document layout 304, and communication templates 208 (e.g., including a variables list template 306, a field name conversion template 308, or a null values templates 310) may be processed by a document generation module 210 with communication data 302 to generate communication documents 212.

Figure 4:
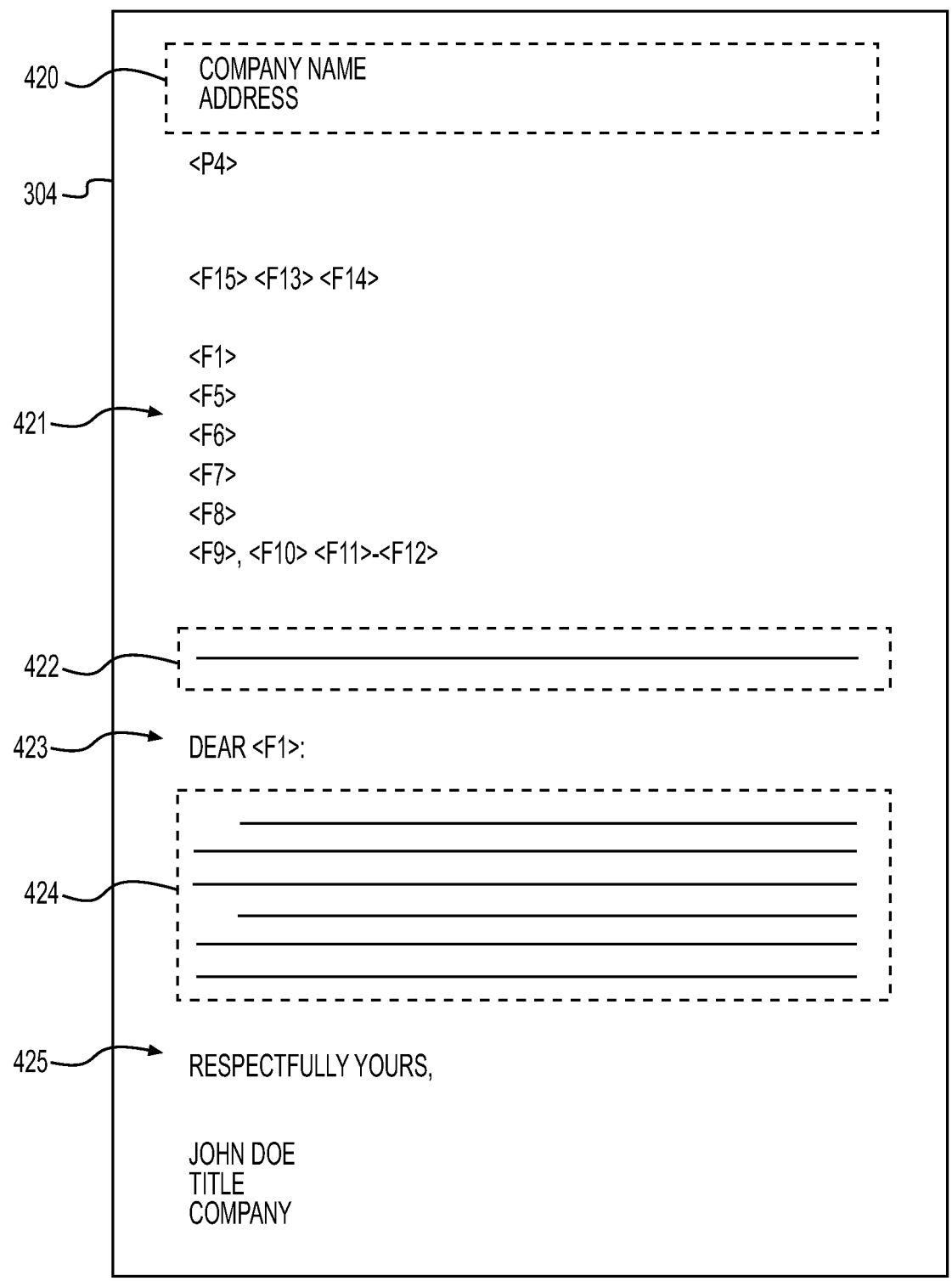
FIG. 4 depicts an exemplary document layout that is used to generate communication documents, according to one or more embodiments.

FIG. 4 illustrates an exemplary document layout 304 that is used to generate the communication documents 212. Document layout 304 may include sections such as heading 420 (e.g., a section describing the name and address of the employer of the communication requestor), address block 421 (e.g., a section describing the address of the recipient of the communication), subject line 422 (e.g., a section describing a summary of the communication), addressee section 423 (e.g., a section describing a name of the addressee or recipient), body section 424 (e.g., a section describing the content of the communication), and signature block 425 (e.g., a section enabling an individual to sign).

By way of example, document layout 304 may include one or more variables, such as P4, F15, F13, F14, F1, F5, F6, F7, F8, F9, F10, F11, and F12 shown in FIG. 4. A variable may specify a field or data field. The value of a variable, for purposes of generating a communication document 212, may be supplied by communication data 302 and/or communication specification 202 that is external to the document layout 304. The value of a variable may differ from one communication document 212 to another communication document 212. For example, the variable F1 may be a personal name of a recipient of communication document 212 that is to be generated using document layout 304. In this case, communication data 302 may supply a value of variable F1 in different communication documents based on different personal names to each respective communication document 212. Similarly, the variable P4 may be a date that is to be shown in the communication document 212. In this situation, communication data 302 may supply a value of variable P4 in different communication documents based on different dates of each respective communication document 212.

In addition to variables whose values can be varied, document layout 304 may also include one or more fixed elements whose content is constant. For example, in addressee section 423, the term "dear" may be a fixed text that appears in all communication documents 212 generated from document layout 304, while F1 is a variable. Body section 424, for example, may also include a fixed element (not shown), such as, greeting language. The variables included in document layout 304 may depend on the content of the communication document 212. While the document layout 304 shown in FIG. 4 is illustrated as a layout for a letter, the document layout 304 may instead have variables suitable for other types of documents without departing from the scope of this disclosure.

The full list of variables used in document layout 304 may be named in communication specification 202. Furthermore, the variables appearing in document layout 304 and communication specification 202 may be a subset of variables that are recognizable by computer system 110. Table 1 below may provide an example of a list of variables recognizable by computer system 110. The list of variables recognizable by computer system 110 may be defined as part of data referred to as a template layout. In the example shown in Table 1, the "field name" may be referred to as a "template name" of a variable. Such field name may be a standardized version or a description of field name. In addition to field IDs or field names that are represented in Table 1, the field IDs can also include various IDs indicative of further information (e.g., information regarding product data such as a dollar amount of the product, and copy information used to drive different copy examples). A partial portion of such variables appear in document layout 304 shown in FIG. 4.

TABLE 1

| Template Layout Variables | |
|---|---|
| F1 | Name1 |
| F2 | Name2 |
| F3 | Name3 |
| F4 | Name4 |
| F5 | Primary Address Line 1 |
| F6 | Secondary Address Line 2 |
| F7 | Additional Address Line 3 |
| F8 | Additional Address Line 4 |
| F9 | City |
| F10 | State |
| F11 | Zip Code |
| F12 | Zip + 4 |
| F13 | Production Cell Number |
| F14 | Test Cell |
| F15 | Strategy Number |
| F16 | English Product/Offer Name |
| F17 | Customer Unique Identifier |
| F18 | Cust Ref Number/Promo Code/Offer Code |
| F19 | Last 4 Digits of Customer Acct # |
| F20 | Checking Acct Name or Type |
| F21 | Check Routing Number |
| F22 | Checking Acct Number |
| F23 | Branch Name |
| F24 | Branch Street Address |
| F25 | Branch City Name |
| F26 | Branch State |
| F27 | Branch Zip Code |
| F28 | Branch Miles Away |
| F29 | Generic Customer Information 1 |
| F30 | Generic Customer Information 2 |
| F31 | Generic Customer Information 3 |
| F32 | Generic Customer Information 4 |
| F33 | Generic Customer Information 5 |

As described above, variables in document layout 304 may be specified based on communication data 302. In some embodiments, communication data 302 may be the same as communication specification 202. In some embodiments, communication data 302 may not be the same as communication specification 202. In this situation, communication data 302 may be data generated based on communication specification 202 or extra data obtained in addition to communication specification 202. For instance, the communication data 302 may be an abbreviated version of the content shown in the communication specification 202. Table 2 below may provide an example of communication data 302 to be used with document layout 304. For purposes of illustration, communication data 302 is represented in Table 2 as a single data table. However, communication data 302 may be stored in any suitable manner of data organization.

TABLE 2

Communication Data

| Record No. | FULL_NM | ADR_LINE_1_TXT | ADR_LINE_2_TXT | CITY_NM | GEO_ST-CD |
|---|---|---|---|---|---|
| 1 | John A. Smith | 1200 First St. | APT 100 | Little Neck | NY |
| 2 | Jane S. Doe | 1300 Second St. | (Blank) | Lake Charles | CA |
| 3 | . . . | . . . | (Blank) | . . . | . . . |
| 4 | . . . | . . . | (Blank) | . . . | . . . |
| 5 | . . . | . . . | . . . | . . . | . . . |
| 6 | Null | Null | . . . | . . . | . . . |
| 7 | . . . | . . . | . . . | . . . | . . . |
| 8 | . . . | . . . | (Blank) | . . . | . . . |
| 9 | Null | Null | (Blank) | . . . | . . . |

As shown, communication data 302 may include various data fields, such as "FULL_NM" (representing a full name of a person) and "ADR_LINE_1_TXT" (representing the first line of the address of that person). Communication data 302 may include various data records, represented as rows, each of which may include a value for various fields. In Table 2, an ellipsis ( . . . ) may be used to represent the non-presence of data in the corresponding field. The descriptor ("Blank") may be used to represent a data field record having a blank value, while the descriptor "Null" may indicate a field record that is null. A null data record may be, for example, the absence of any record for the respective field, and a blank data record may be, for example, a record with zero length.

In the exemplary communication data 302 represented by Table 2, above, each record row may correspond to a communication document 212 that is generated (or intended to be generated) by the document generation module 210. Record No. 1 may inform the generation of a communication document 212 to be sent to John A. Smith, in which the name "John A. Smith" (as specified by the value of "FULL_NM" for that record) and the address line "1200 First St. APT 100" (as specified by the value of "ADR_LINE_1_TXT" for that record) may be printed in the address block 421 of the document layout 304 used to generate the communication document 212. Similarly, Record No. 2 may inform the generation of another communication document 212 to be sent to Jane S. Doe, in which the name "Jane S. Doe" and the address line "1200 First St. APT 100" may be printed in the address block 421 of the document layout 304 used to generate the communication document 212.

Communication templates 208 may be used to process communication data 302 for document generation. Communication templates 208 may include a plurality of templates, such as a variables list template 306, a field name conversion template 308, and a null values template 310. These templates are discussed in more detail below. The variables list template 306 may specify the variables that are used in the communication (e.g., present in communication specification 202 and/or communication data 302). Specifically, variable list template 306 may define, for each variable in the template layout variables, whether or not that variable appears in the communication specification 202 and/or communication data 302.

FIG. 5 illustrates details associated with an exemplary variables list template 306, an exemplary field name conversion template 308, and an exemplary null values template 310. In the example shown in FIG. 5, variables list template 306 may indicate that variables F1 to F4 are present in communication specification 202 and/or communication data 302, whereas variables F22 and F23 may be variables usually defined in the document layout, but may be not present in communication specification 202 and/or communication data 302.

The exemplary field name conversion template 308 may specify a correspondence between fields in communication data 302 and fields in the template layout variables. For example, the field "FULL_NM" in the exemplary communication data 302 shown in field name conversion template 308 may be specified to correspond to field F1 of the template layout variable shown in Table 1. The correspondence between fields in communication data 302 and fields of the template layout variables may be defined or specified in any suitable manner. The correspondence may be based on field IDs of the template layout variables and/or field names of the template layout variables. For example, instead of identifying F1, F5, F6, F9, and F10, field name conversion template 308 may instead identify "Name1", "Primary Address Line 1", "Secondary Address Line 2", "City" and "State," respectively. In this situation, the field "FULL_NM" in the exemplary communication data 302 shown in field name conversion template 308 may be specified to correspond to "Name 1" of the template layout variables shown in Table 1.

Field name conversion template 308 may be used for specifying the variables of document layout 304. For example, in the document generation process, the communication data 302 may be queried from a database. To generate a communication document 212 for each record, the field name conversion template 308 may be used to specify the variables of document layout 304. For example, given that Record No. 1 has a value of "John A. Smith" for the field "FULL_NM," document generation module 210 may use this value, "John A. Smith," for the variable F1 of document layout 304, based on the field name correspondence specified in field name conversion template 308.

The null values template 310 may indicate each field record in the communication data that is null. The null values template 310 may include a list of each null data record, as identified by a combination of the field and the record number. In null values template 310, the field may be identified by either the field name in the communication data 302, or a field in the template layout variables. For example, "address" shown in null values template 310 may be recorded as "ADR_Line_1_TXT", "F5", or "Primary Address Line 1." The null values template 310 may be used to handle exceptions in the document generation process. For example, if a record has a null value for a field that is determined to be needed by document layout 304, then generation of a communication document 212 for that record may be skipped, or any communication document 212 based on that record may be flagged (or otherwise indicated) for later processing.

Figure 6:
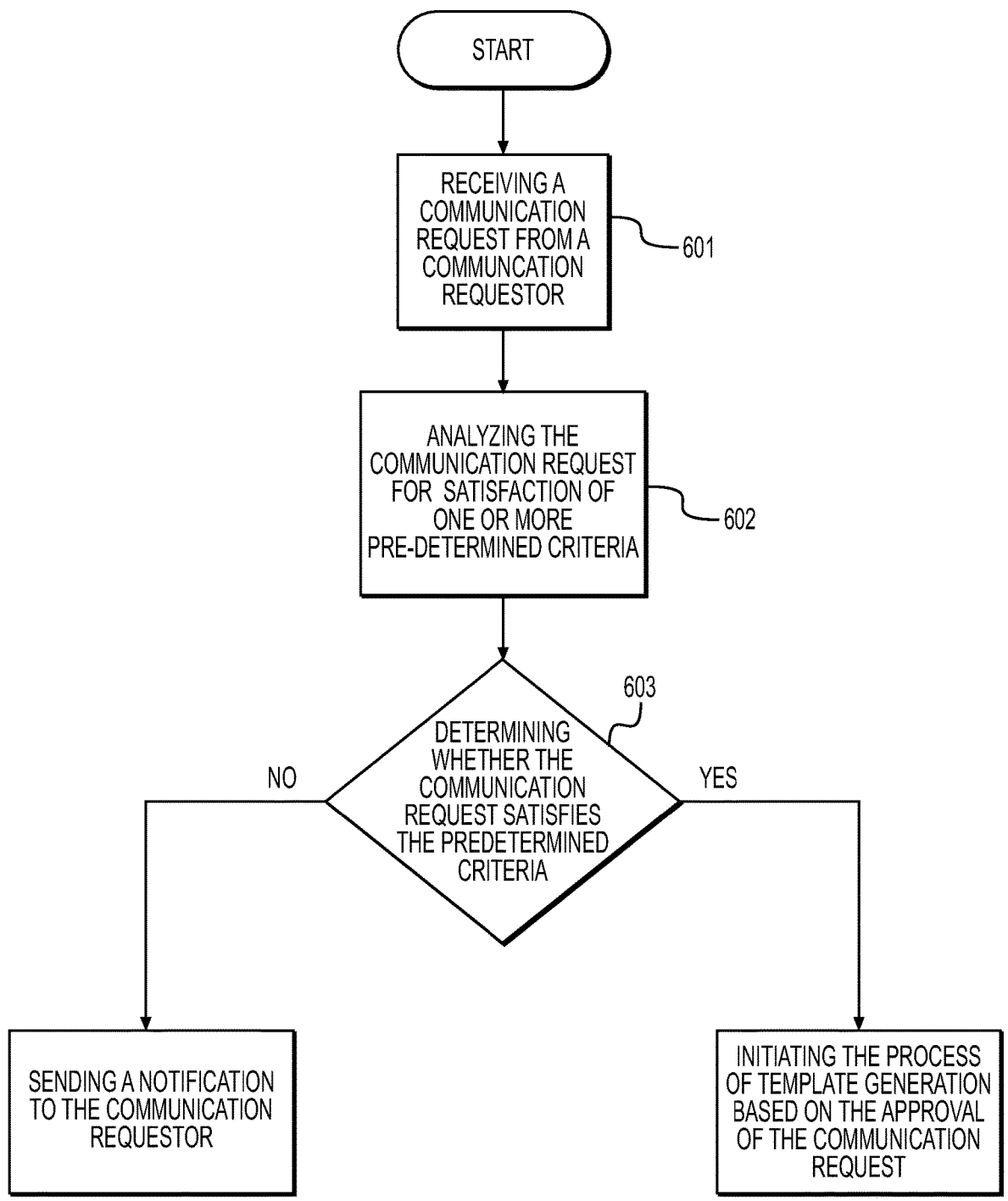
FIG. 6 is a flowchart illustrating a method for initiating template generation, according to one or more embodiments.

FIG. 6 is a flowchart illustrating a method for initiating generation of communication documents, according to one or more embodiments of the present disclosure. The method may be performed by computer system 110.

Step 601 may include receiving a communication request (e.g., a communication request form) from a communication requestor. The communication request may provide information associated with communication specification 202. Step 602 may include analyzing the communication request for satisfaction of one or more pre-determined criteria. The one or more pre-determined criteria may include that the communication request is correct (e.g., no errors appear in the communication request), the communication request is up-to-date, the communication request is not duplicative of another communication request, and/or the communication request complies with laws, policies, and/or regulations. Step 603 may include upon determining that the communication request satisfies the predetermined criteria, approving the communication request or initiating the process of template generation based on the approval of the communication request, or upon determining that the communication request does not satisfy the predetermined criteria, sending a notification to the communication requestor. The notification may include a request for the communication requestor to resend a communication request, an error message that the communication request does not satisfy one or more pre-determined criteria, or any information related to the communication request or communication requestor.

Figure 7:
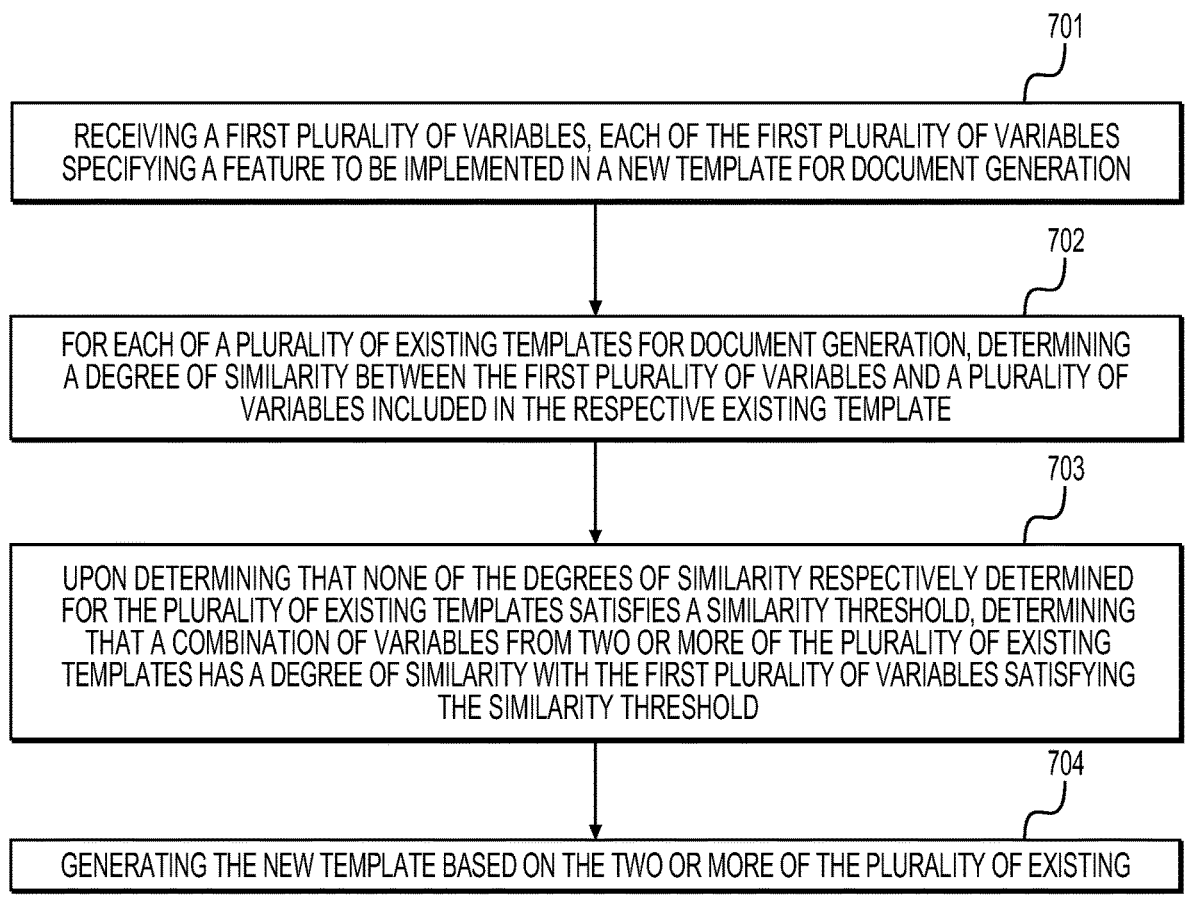
FIG. 7 depicts a flowchart of an exemplary method of generating a template, according to one or more embodiments.

FIG. 7 depicts a flowchart of an exemplary method of generating a template, according to one or more embodiments of the present disclosure. The method may be performed by computer system 110.

Step 701 may include receiving a first plurality of variables. Each of the first plurality of variables may specify a feature to be implemented in a new template for document generation. The first plurality of variables may include a variable specifying a data field to be included in a document. For example, the data field may include a name field, an address field, and/or an account number field, etc. The name field may include any name (e.g., an actual name or username of a user or customer) associated with a communication or template. The address field may include any address (e.g., a residence address associated with a communication or template to a user or customer) associated with a communication or template. The account number field may include any account number (e.g., an account number of a user or customer), or portion thereof (e.g., last 4 digits) associated with a communication or template. Such an account number may be a card number (or identification/ account vehicle number) associated with a user or customer. The data field may further include any fields associated with information of the user, the customer, or the operator, including, a phone number field (e.g., including any phone number associated with a communication or template to the user, the customer, or the operator), an e-mail addresses field (e.g., including any e-mail addresses associated with a communication or template to the user, the customer, or the operator), an age field (e.g., including an age associated with the user, the customer, or the operator), a gender field (e.g., including a gender associated with the user, the customer, or the operator), an income level field (e.g., including an income level associated with a user or customer), an educational background field (e.g., including an educational background with the user, the customer, or the operator), or an employment field (e.g., including an employment associated with the user, the customer, or the operator). The first plurality of variables may include any information associated with a communication, including, for example, information depicting a communication specification 202.

The first plurality of variables may include a variable specifying a correspondence between a field name in raw data and a field name included in a predetermined set of field names (e.g., a correspondence between fields in communication data 302 and fields in the template layout variables). The specifying a correspondence between a field name in a raw data and a field name included in a predetermined set of field names may include matching the field name in the raw data and the field name included in the predetermined set of field names. The field name in the raw data may include the field name determined in the communication request. The field name included in a predetermined set of field names may include field names determined in a plurality of existing templates (e.g., templates stored in template inventory 206). The correspondence between the field name in the raw data and the field name included in the predetermined set of field names may be defined or specified in any suitable manner (e.g., a complete match or a match equal to or exceeding a predetermined threshold of similarity, or an algorithm connecting an abbreviated version of a field name and a standard version of a field name).

Step 702 may include, for each of a plurality of existing templates for document generation, determining a degree of similarity between the first plurality of variables and a plurality of variables included in the respective existing template. The determining a degree of similarity between the first plurality of variables and a plurality of variables included in the respective existing template may include comparing the first plurality of variables and a plurality of variables included in the respective existing template. One or more algorithms may be used to compare the first plurality of variables and a plurality of variables included in the respective existing template. The degree of similarity may indicate a level of overlap or proximity between the first plurality of variables and a plurality of variables included in the respective existing template. In a first scenario in which the first plurality of variables and a plurality of variables included in the respective existing template overlap, the degree of similarity may be relatively high (e.g., equal to or exceeding a predetermined threshold of similarity). In a second scenario in which the first plurality of variables and a plurality of variables included in the respective existing template may not overlap, then the degree of similarity may be lower than the degree of similarity in the first scenario. The degree of similarity may include statistical measurements, such as Gaussian similarities.

For each of the plurality of existing templates, the degree of similarity may be determined based on a number of variables that are common to both the plurality of variables included in the respective existing template and the first plurality of variables. For instance, the first plurality of variables may include a variable specifying a name field, an address field, and an account number field; and the plurality of variables included in the respective existing template may include a variable specifying a name field, an address field, and an account number field; then the number of variables that are common may be three, and the degree of similarity may be high.

Step 703 may include, upon determining that none of the degrees of similarity respectively determined for the plurality of existing templates satisfies a similarity threshold, determining that combination of variables from two or more of the plurality of existing templates may have a degree of similarity with the first plurality of variables satisfying the similarity threshold. For example, if none of the plurality of existing templates satisfies a similarity threshold, a combination of variables from three of the plurality of existing templates having a degree of similarity with the first plurality of variables satisfying the similarity threshold may be determined.

The determining that a combination of templates may include a plurality of variables having a degree of similarity with the first plurality of variables satisfying the similarity threshold may include identifying a plurality of combinations of templates, each of the plurality of combinations of templates being a combination of two or more templates from the plurality of existing templates (e.g., templates stored in template inventory 206). For each of the plurality of combinations of templates, the determining may further include identifying a combination of variables in different respective templates of the respective combination of templates and determining a degree of similarity between the combination of variables and the first plurality of variables. Further, the determining may include determining that the degree of similarity determined for the respective combination of variables of one of the plurality of combinations of templates satisfies the similarity threshold. For each of the plurality of combinations of templates, the degree of similarity may be determined based on a number of variables that are common to both the plurality of variables of the respective combination of templates and the first plurality of variables. For example, there may be 20 existing templates stored in a database (e.g., template inventory 206), and 5 out of 20 existing templates may be identified first. In this situation, for each of the identified 5 existing templates, a combination of variables in the identified 5 existing templates may be identified and a degree of similarity between the combination of variables and the first plurality of variables may be determined. If such degree of similarity between the combination of variables in the identified 5 existing templates and the first plurality of variables satisfies the similarity threshold, then a new template may be generated as the combination of the identified 5 existing templates.

For each of the plurality of combinations of templates, the degree of similarity may be determined based on a number of variables that are common to both the plurality of variables of the respective combination of templates and the first plurality of variables. For instance, the first plurality of variables may include a variable specifying a name field, an address field, and an account number field; and the plurality of variables of the respective combination of templates may include a variable specifying a name field, an address field, and an account number field. In such a scenario, the number of variables that are common may be 3, and the degree of similarity may be high. In another example, the first plurality of variables may include a variable specifying a name field, an address field, and an account number field; and the plurality of variables of the respective combination of templates may include a variable specifying an education field; then the number of variables that are common may be zero, and the degree of similarity may be low.

Step 704 may include generating the new template based on the two or more of the plurality of existing templates. The generating the new template may include generating the new template using a trained machine learning model. The machine learning model may be a neural network having input nodes. The generating the new template may include inputting values associated with the first plurality of variables and values associated with variables of the combination of two or more templates into the input nodes of the neural network. The plurality of existing templates may be a set of templates stored in a memory of the computer system 110 (e.g., stored in template inventory 206). The method may further include, after the generating the new template, adding the new template to the existing templates stored in template inventor 206.

The trained machine learning algorithm may include a regression-based model that accepts a plurality of variables and/or existing templates as input data. The trained machine learning algorithm may be part of the algorithm model 112. The trained machine learning algorithm may be of any suitable form, and may include, for example, a neural network, as noted above. A neural network may be software representing a human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through a connections' weight. The trained machine learning algorithm may include a convolutional neural network (CNN), a deep neural network, or a recurrent neural network (RNN). For each of the existing templates, in a neural network, for instance, input data may include the first plurality of variables, and a weight may be determined by the presence or absence of certain variables from a communication request. The value of the weight or the input data may be a Boolean value. One or more functions may be created by the neural network in order to generate the new template based on the existing templates. In one example, the trained machine learning algorithm may be a multi-layer feedforward perceptron neural network with at least 268 input nodes and around 10 hidden layers per communication.

The trained machine learning algorithm may generate the new template as a function of the plurality of variables, existing templates, and/or one or more additional variables indicated in the input data. The one or more additional variables may be derived from the plurality of variables and/or existing templates. This function may be learned by training the machine learning algorithm with training sets. The machine learning algorithm may be trained by supervised, unsupervised or semi-supervised learning using training sets comprising data of types similar to the type of data used as the model input. For example, the training set used to train the model may include any combination of the plurality of variables and/or existing templates. Additionally, the training set used to train the model may further include user data, including, but not limited to, demographic information of the user or other data related to the user. Accordingly, the machine learning model may be trained to map input variables to a quantity or value of variables in the new template. That is, the machine learning model may be trained to determine a quantity or value of the new template as a function of various input variables.

In an exemplary embodiment, a machine learning model is employed to generate a new template based on two or more existing templates. The machine learning model may be trained, based on a further plurality of variables as training data and a plurality of existing templates as ground truth, to (1) determine one or more associations between one or more of the further plurality of variables, and (2) generate a template based on an input plurality of variables, an input two or more templates, and the determined one or more associations. In an exemplary embodiment, a machine learning is model further and/or alternatively trained to (3) determine, for an input plurality of variables and an input one or more templates, whether one or more additional variables is likely to be associated with the input plurality of variables, and (4) generate a new template based on the input plurality of variables, the input one or more templates, and any additional variables determined to be likely to be associated with the input plurality of variables. The further plurality of variables may be, for example, a superset of variables from which variables in the communication request and/or existing templates are selected. In an exemplary use case, the machine learning model, when trained, may learn that a combination of two variables, e.g., name and street address, are likely to be joined by a third variable, e.g., zip code. When identifying a combination of two existing templates that satisfy the similarity threshold to the plurality of variables in a communication request, the machine learning model may determine that a first of the two templates includes the name variable, and that the second includes the street address variable, but that neither includes the zip code variable. The machine learning model may then generate a new template that includes all three variables.

Prior to step 701, or at any stage of template generation, the method may further include recording a first template for document generation. The recording the first template may include receiving a user input specifying a file including a list of variables; identifying the list of variables in the file; and generating the first template such that the first template includes the list of variables. Further, prior to step 701, or at any stage of template generation, the method may include including the first template in a plurality of existing templates for document generation, the plurality of existing templates being a set of templates stored in the memory (e.g., stored in template inventory 206). Such first template may be stored with the plurality of existing templates for document generation in one or more databases associated with one or more resources 140, computer system 110, or entity 105, such as, e.g. template inventory 206.

Figure 8:
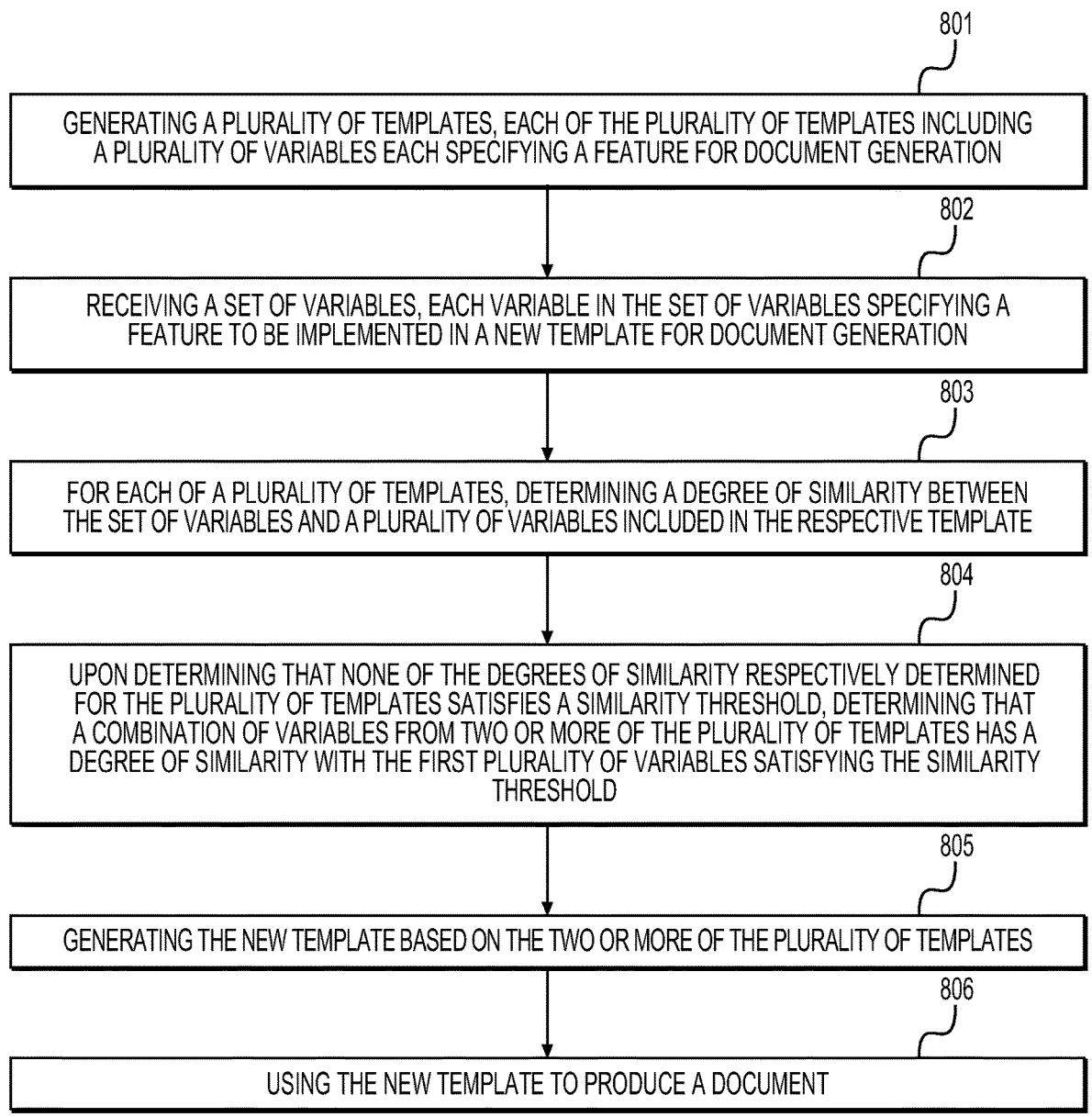
FIG. 8 depicts a flowchart of another exemplary method of generating a template, according to one or more embodiments of the present disclosure.

FIG. 8 depicts a flowchart illustrating another exemplary method for template generation, according to one or more embodiments of the present disclosure. The method may be performed by computer system 110.

Step 801 may include generating a plurality of templates, each of the plurality of templates including a plurality of variables each specifying a feature for document generation. The generating a plurality of templates may be initiated once a request to generate the plurality of templates is received. Such request may include any information or criteria of generating a plurality of templates. The plurality of templates may be generated by choosing a number of existing templates stored in one or more databases associated with one or more resources 140, computer system 110, or entity 105. The plurality of templates may include any type of templates, including, for example, the variables list template 306, the field correspondence template 308, or the null values template 310. Once the plurality of templates has been generated, they may be stored with the plurality of existing templates (e.g., stored in template inventory 206). The generated templates may be stored in one or more memory units, on-board an external device (e.g., user device 150, an operator device 160, or a separate device of any of the types described above), or distributed over multiple devices (e.g., peer-to-peer, cloud-computing based infrastructure). A single copy of each of the generated templates may be stored, or multiple copies may be stored. The multiple copies may be stored at different memory units. For instance, the multiple copies may be stored on different devices (e.g., a first copy on a memory unit, and a second copy on-board an external device).

Step 802 may include receiving a set of variables, each variable in the set of variables specifying a feature to be implemented in a new template for document generation. The set of variables may be the first plurality of variables that may include a variable specifying a data field to be included in a document. The data field may include a name field, an address field, and/or an account number field. The name field may include any name (e.g., an actual name or username of a user or customer) associated with a communication or template. The address field may include any address (e.g., a residence address associated with a communication or template to a user or customer) associated with a communication or template. The account number field may include any account number (e.g., an account number of a user or customer), or portion thereof (e.g., the last four digits) associated with a communication or template. Such account number may be a card number (or identification/ account vehicle number) associated with a user or customer. The data field may further include any fields associated with information of the user, the customer, or the operator, including, a phone number field (e.g., including any phone number associated with a communication or template to the user, the customer, or the operator), an e-mail address field (e.g., including any e-mail addresses associated with a communication or template to the user, the customer, or the operator), an age field (e.g., including an age associated with the user, the customer, or the operator), a gender field (e.g., including a gender associated with the user, the customer, or the operator), an income level field (e.g., including an income level associated with a user or customer), an educational background field (e.g., including an educational background of the user, the customer, or the operator), or an employment field (e.g., including an employment associated with the user, the customer, or the operator). The first plurality of variables may include any information associated with a communication, including, for example, information depicting the communication specification 202.

Step 803 may include, for each of a plurality of templates, determining a degree of similarity between the set of variables and a plurality of variables included in the respective template. The determining a degree of similarity between the set of variables and a plurality of variables included in the respective template may include comparing the set of variables and a plurality of variables included in the respective template. One or more algorithms may be used to compare the set of variables and a plurality of variables included in the respective template. The degree of similarity may indicate a level of overlap or proximity between the set of variables and a plurality of variables included in the respective template. In a first scenario in which the set of variables and a plurality of variables included in the respective template overlap, the degree of similarity may be relatively high (e.g., equal to or exceeding a predetermined threshold of similarity). In a second scenario in which the set of variables and a plurality of variables included in the respective template may not overlap, the degree of similarity may be lower than the degree of similarity in the first scenario. The degree of similarity may include statistical measurements, such as Gaussian similarities.

Step 804 may include, upon determining that none of the degrees of similarity respectively determined for the plurality of templates satisfies a similarity threshold, determining that a combination of variables from two or more of the plurality of templates has a degree of similarity with the plurality of variables satisfying the similarity threshold. For example, if none of the degrees of similarity respectively determined for the plurality of templates satisfies a similarity threshold, a combination of variables from multiple templates (e.g., 2 or 3 or more templates) of the plurality of templates may be found to have a degree of similarity with the plurality of variables satisfying the similarity threshold.

The determining that a combination of variables from two or more of the plurality of templates has a degree of similarity with the plurality of variables satisfying the similarity threshold may include identifying a subset of the plurality of templates, each of the subset of templates including one or more variables similar to the plurality of variables; for each of the subset of templates, identifying a combination of variables in different respective templates and determining a degree of similarity between the combination of variables and the plurality of variables; and determining that the degree of similarity determined for the combination of variables satisfies a similarity threshold. For example, there may be 20 generated templates, and 5 out 20 templates may be identified first. In this situation, for each of the combination of 5 templates, a combination of variables of 5 existing templates may be identified and a degree of similarity between the combination of variables and the first plurality of variables may be determined. If such degree of similarity between the combination of variables and the first plurality of variables satisfies the similarity threshold, then a new template may be generated based on the combination of 5 templates.

Step 805 may include generating the new template based on the two or more of the plurality of templates. One or more algorithms may be used to generate the new template. The one or more algorithms may include a machine learning algorithm. Details of the machine learning algorithm are described elsewhere herein. The generating the new template may include combining variables of two or more of the plurality of templates. The plurality of templates may be a set of templates stored in a memory of a computer system (e.g., stored in template inventory 206); and the method may include, after the generating the new template, adding the new template to the set of templates.

Step 806 may include using the new template to produce a document (e.g., communication document 212). The communication document 212 may be transmitted to a user once the communication document 212 is produced. Transmitting the communication document 212 may include transmitting the communication document 212 via any methods, including an e-mail, a text, a chat, a chime, a notification pop-up, a website, or a phone call. The communication document 212 may be displayed in a user interface. In some embodiments, the communication document 212 may be configured to be displayed on a display screen of a user device associated with the user (e.g., user device 150). The communication document 212 may be displayed on the display screen in any suitable form, such as an e-mail, a text message, a push notification, content on a webpage, and/or any form of graphical user interface. The user device 150 may be capable of accepting inputs of a user via one or more interactive components of the user device 150, such as a keyboard, button, mouse, touchscreen, touchpad, joystick, trackball, camera, microphone, or motion sensor. Such inputs may include accepting the communication document 212, rejecting the communication document 212, filtering the communication document 212, highlighting the communication document 212, replying to the communication document 212, automatically responding the communication document 212, and/or forwarding the communication document 212.

Figure 9:
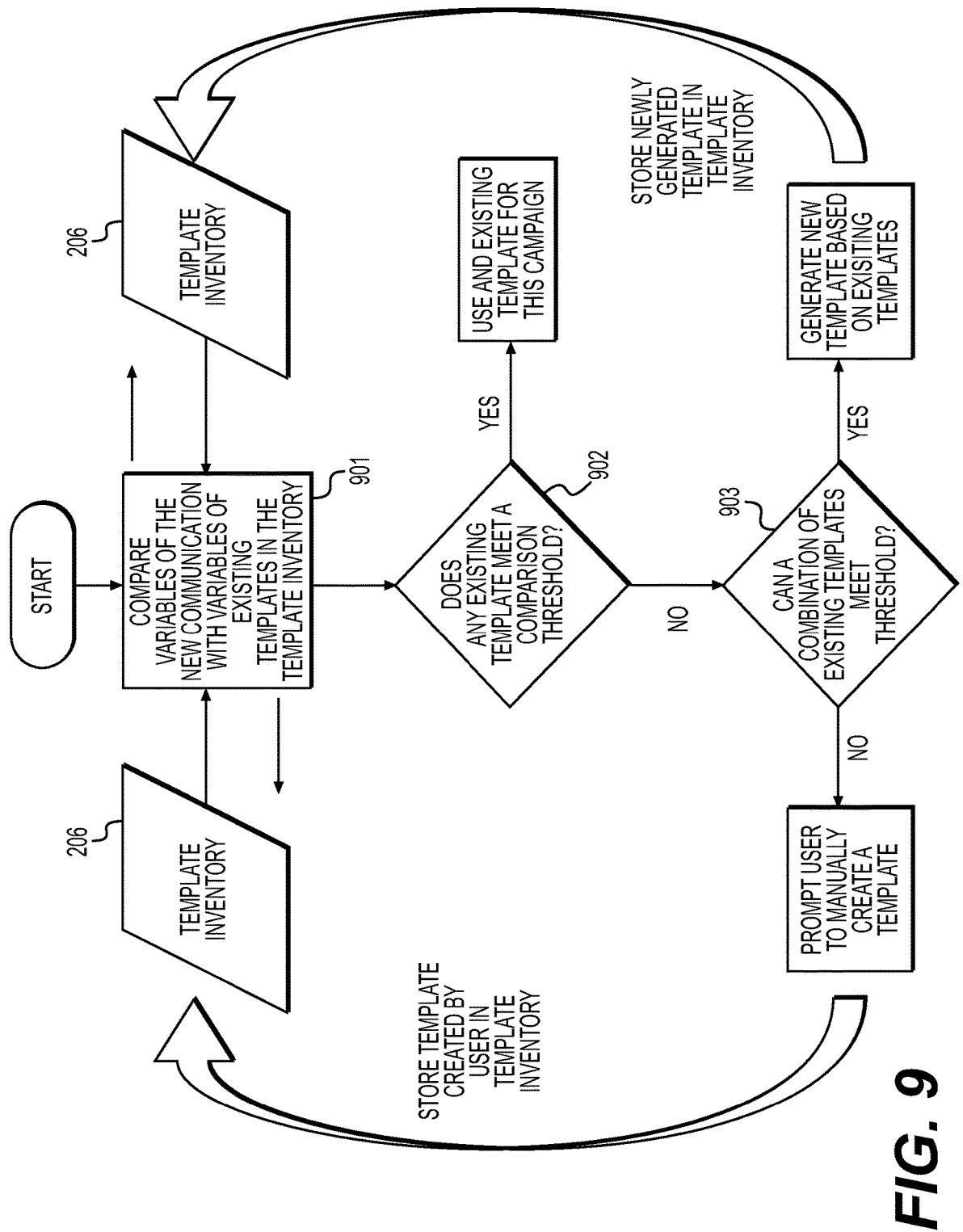
FIG. 9 depicts a process flow diagram indicative of a process for generating a template and producing a communication document, according to one or more embodiments of the present disclosure.

FIG. 9 depicts a process flow diagram indicative of a process for generating a template and producing a communication document, according to one or more embodiments of the present disclosure. The method may be performed by a computer system, such as computer system 110 described above. As described above, communication templates 208 may be used for production of communication documents 212. Therefore, in order to launch and implement a communication, communication templates 208 may be created for the new communication. Communication templates 208 may be generated manually or automatically.

In step 901, computer system 110 may compare the variables of the new communication with variables of existing templates in the template inventory 206. Template inventory 206 may store a plurality of templates respectively corresponding to a plurality of communications. The plurality of templates may include a variables list template 306, a field name conversion template 308, and a null values template 310. In step 901, the comparison may be based on the variables list template 306 stored in template inventory 206, rather than other types of templates such as field name conversion templates 308 and null values templates 310. The comparison may compare one or more variables of the new communication with one or more variables in a given variables list template, to derive a comparison score. The comparison score may be, for example, a percentage of the variables of the new communication that is specified in the given variables list template as being used in the communication represented by the given variables list template. This comparison may be performed for each variables list template stored in the template inventory 206, so as to compute a comparison score for each variables list template. This score may also be associated with the template set that includes the variables list template.

Based on comparison scores, in step 902, computer system 110 may determine whether any existing template set satisfies a comparison threshold or similarity threshold. If at least one existing template set meets a comparison threshold or similarity threshold (step 902: yes), the at least one existing template may be used to generate the new communication document. If no one existing template set meets a comparison threshold or similarity threshold (step 902: no), then computer system 110 may proceed to step 903 and determine whether a combination of existing templates may meet a comparison threshold or similarity threshold. If a combination of existing templates meets a comparison threshold or similarity threshold (step 903: yes), the combination of existing templates may be used to generate a new template. If a combination of existing templates does not meet a comparison threshold or similarity threshold (step 903: no), then computer system 110 may enable a user or operator to manually create a new template. The new template may be generated by the user or the operator based on the combination of existing templates which may be stored in template inventory 206.

The method of communication document production and template generation may include receiving a communication request, communication specification, and/or communication data; analyzing and verifying the communication request, communication specification, and/or communication data satisfying one or more pre-determined criteria to generate templates or produce communication specification; transforming raw data obtained from the communication request, communication specification, and/or communication data into standard data (e.g., data shown in the template layout) associated with variables in the existing templates; receiving user inputs based on the transformed data; generating a first template based on the user inputs; comparing the first template with the existing templates; and generating a second template (e.g., a new template) based on the comparison of the first template and existing templates.

In general, any process discussed in this disclosure that is understood to be computer-implementable, such as the processes illustrated in FIGS. 2, 3, and 6-9, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110, an operator device 160, and/or user device 150, may include one or more computing devices. If the one or more processors of the computer system 110, an operator device 160, and/or user device 150 are implemented as a plurality of processors, the plurality of processors may be included in a single computing device or distributed among a plurality of computing devices. If a computer system 110, an operator device 160, and/or user device 150 comprises a plurality of computing devices, the memory of the computer system 110, an operator device 160, and/or user device 150 may include the respective memory of each computing device of the plurality of computing devices.

Figure 10:
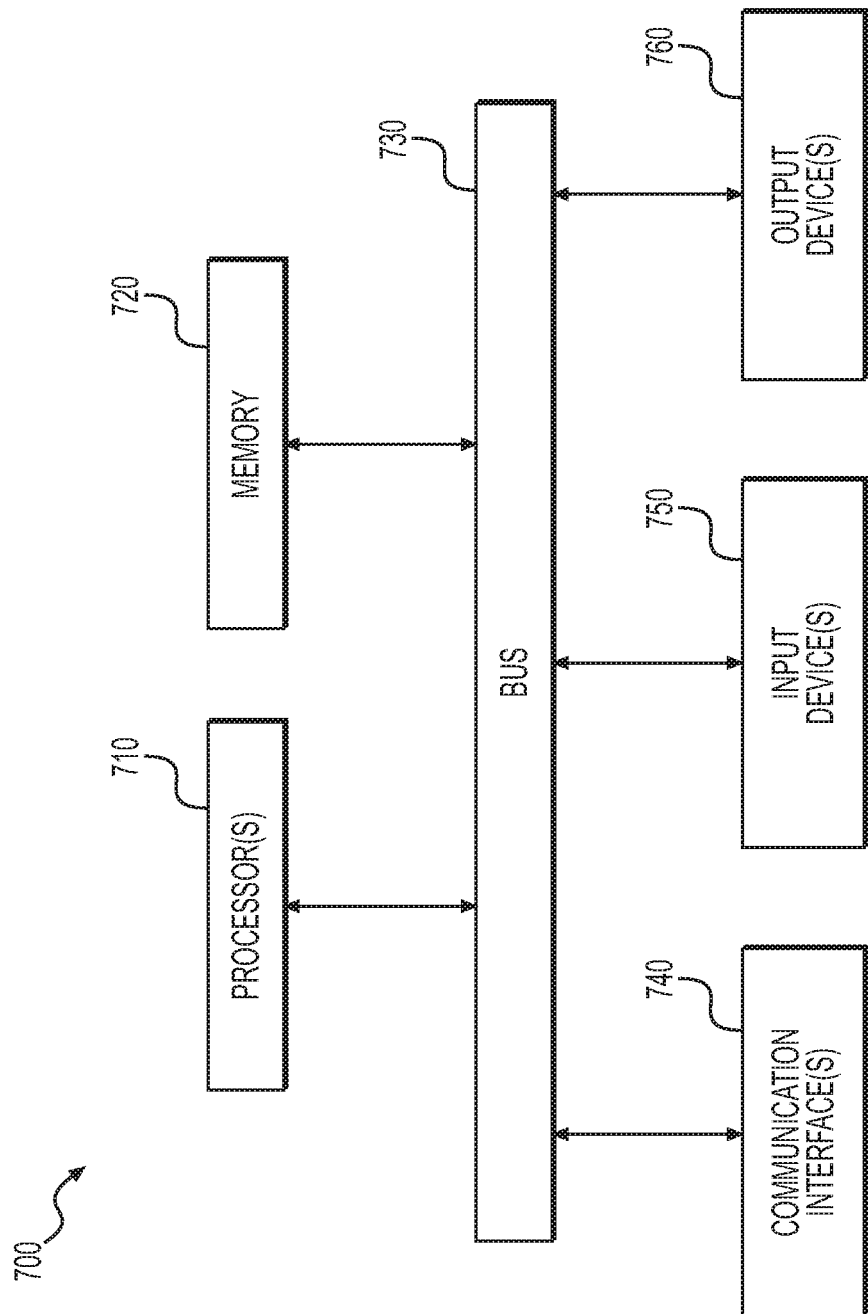
FIG. 10 depicts an example of a computing device, according to one or more embodiments.

FIG. 10 illustrates an example of a computing device 700 of a computer system, such as computer system 110, an operator device 160, and/or user device 150. The computing device 700 may include processor(s) 710 (e.g., CPU, GPU, or other such processing unit(s)), a memory 720, and communication interface(s) 740 (e.g., a network interface) to communicate with other devices. Memory 720 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 720. The computing device 700 may, in some embodiments, further include input device(s) 750 (e.g., a keyboard, mouse, or touchscreen) and output device(s) 760 (e.g., a display, printer). The aforementioned elements of the computing device 700 may be connected to one another through a bus 730, which represents one or more busses. In some embodiments, the processor(s) 710 of the computing device 700 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure.

What is claimed is:

1. A computer-implemented method for template generation, the method comprising:
   receiving a first plurality of variables, each of the first plurality of variables specifying a feature to be implemented in a new template for document generation;
   for each of a plurality of existing templates for document generation, determining a degree of similarity between the first plurality of variables and a plurality of variables included in the respective existing template;
   upon determining that none of the degrees of similarity respectively determined for the plurality of existing templates satisfies a similarity threshold, determining that a combination of variables from two or more of the plurality of existing templates has a degree of similarity with the first plurality of variables satisfying the similarity threshold; and employing a machine learning model to generate the new template based on the two or more of the plurality of existing templates, wherein the machine learning model is trained, based on a further plurality of variables as training data and a plurality of existing templates as ground truth, to:
  determine one or more associations between one or more of the further plurality of variables; and
  generate a template based on an input plurality of variables, an input two or more templates, and the determined one or more associations.

2. The method of claim 1, wherein, for each of the plurality of existing templates, the degree of similarity is determined based on a number of variables that are common to both the plurality of variables included in the respective existing template and the first plurality of variables.

3. The method of claim 1, wherein the determining that a combination of templates includes a plurality of variables having a degree of similarity with the first plurality of variables satisfying the similarity threshold includes:
  identifying a plurality of combinations of templates, each of the plurality of combinations of templates being a combination of two or more templates from the plurality of existing templates;
  for each of the plurality of combinations of templates, identifying a combination of variables in different respective templates of the respective combination of templates and determining a degree of similarity between the combination of variables and the first plurality of variables; and
  determining that the degree of similarity determined for the respective combination of variables of one of the plurality of combinations of templates satisfies the similarity threshold.

4. The method of claim 3, wherein, for each of the plurality of combinations of templates, the degree of similarity is determined based on a number of variables that are common to both the plurality of variables of the respective combination of templates and the first plurality of variables.

5. The method of claim 1, wherein the machine learning model is further trained to:
  determine, for the input plurality of variables and the input two or more templates, whether one or more additional variables is likely to be associated with the input plurality of variables; and
  generate the template based on the input plurality of variables, the input two or more templates, and any additional variables determined to be likely to be associated with the input plurality of variables.

6. The method of claim 5, wherein
  the machine learning model is a neural network having input nodes, and
  the generating the new template includes inputting values associated with the first plurality of variables and values associated with variables of the combination of two or more templates into the neural network into the input nodes of the neural network.

7. The method of claim 1, wherein
  the plurality of existing templates are a set of templates stored in a memory of a computer system; and
  the method further comprises, after the generating the new template, adding the new template to the set of templates.

8. The method of claim 1, wherein the first plurality of variables includes a variable specifying a data field to be included in a document.

9. The method of claim 8, wherein the data field is a name field, an address field, or an account number field.

10. The method of claim 1, wherein the first plurality of variables includes a variable specifying a correspondence between a field name in a raw data and a field name included in a predetermined set of field names.

11. A computer system for template generation, comprising:
  a memory storing instructions; and
  one or more processors configured to execute the instructions to perform operations including:
    recording a first template for document generation;
    including the first template in a plurality of existing templates for document generation, the plurality of existing templates being a set of templates stored in the memory;
    receiving a first plurality of variables, each of the first plurality of variables specifying a feature to be implemented in a new template for document generation;
    for each of the plurality of existing templates for document generation, determining a degree of similarity between the first plurality of variables and a plurality of variables included in the respective existing template of the plurality of existing templates;
    upon determining that none of the degrees of similarity respectively determined for the plurality of existing templates satisfies a similarity threshold, determining that a combination of variables from two or more of the plurality of existing templates has a degree of similarity with the first plurality of variables satisfying the similarity threshold; and
    employing a machine learning model to generate the new template based on the two or more of the plurality of existing templates, wherein the machine learning model is trained, based on a further plurality of variables as training data and a plurality of existing templates as ground truth, to:
      determine one or more associations between one or more of the further plurality of variables; and
      generate a template based on an input plurality of variables, an input two or more templates, and the determined one or more associations.

12. The computer system of claim 11, wherein the recording the first template includes:
  receiving a user input specifying a file including a list of variables;
  identifying the list of variables in the file; and
  generating the first template such that the first template includes the list of variables.

13. The computer system of claim 11, wherein the determining that a combination of templates includes a plurality of variables having a degree of similarity with the first plurality of variables satisfying the similarity threshold includes:
  identifying a plurality of combinations of templates, each of the plurality of combinations of templates being a combination of two or more templates from the plurality of existing templates and having a plurality of variables;
  for each of the plurality of combinations of templates, identifying a combination of variables in different respective templates of the respective combination of templates and determining a degree of similarity between the combination of variables and the first plurality of variables; and determining that the degree of similarity determined for the respective combination of variables of one of the plurality of combinations of templates satisfies the similarity threshold.

14. The computer system of claim 11, wherein the machine learning model is further trained to:
   determine, for the input plurality of variables and the input two or more templates, whether one or more additional variables is likely to be associated with the input plurality of variables; and
   generate the template based on the input plurality of variables, the input two or more templates, and any additional variables determined to be likely to be associated with the input plurality of variables.

15. The computer system of claim 14, wherein
   the machine learning model is a neural network having input nodes, and
   the generating the new template includes inputting values associated with the first plurality of variables and values associated with variables of the combination of two or more templates into the neural network into the input nodes of the neural network.

16. The computer system of claim 11, wherein the operations further include:
   after the generating the new template, adding the new template to the set of templates stored in the memory.

17. The computer system of claim 11, wherein the first plurality of variables includes a variable specifying a data field to be included in a document.

18. The computer system of claim 17, wherein the data field is a name field, an address field, or an account number field.

19. The computer system of claim 11, wherein the first plurality of variables includes a variable specifying a correspondence between a field name in raw data and a predetermined field name.

20. A computer-implemented method for generation of documents, the method comprising:
   generating a plurality of templates, each of the plurality of templates including a plurality of variables each specifying a feature for document generation;
   receiving a set of variables, each variable in the set of variables specifying a feature to be implemented in a new template for document generation;
   for each of the plurality of templates, determining a degree of similarity between the set of variables and a plurality of variables included in the respective template;
   upon determining that none of the degrees of similarity respectively determined for the plurality of templates satisfies a similarity threshold, determining that a combination of variables from two or more of the plurality of templates has a degree of similarity with the plurality of variables satisfying the similarity threshold; and
   employing a machine learning model to generate the new template based on the two or more of the plurality of existing templates, wherein the machine learning model is trained, based on a further plurality of variables as training data and a plurality of existing templates as ground truth, to:
      determine one or more associations between one or more of the further plurality of variables; and
      generate a template based on an input plurality of variables, an input two or more templates, and the determined one or more associations; and
   using the new template to produce a document.

* * * * *